US007761080B2

(12) United States Patent
Banet et al.

(10) Patent No.: US 7,761,080 B2
(45) Date of Patent: Jul. 20, 2010

(54) EMERGENCY CALL METHOD

(75) Inventors: Franz-Josef Banet, Vaihingen (DE); Markus Jenisch, Waiblingen (DE); Harald Orlamünder, Ditzingen (DE); Wolfgang Lautenschlager, Weissach-Flacht (DE); Wolfgang Klenner, Ditzingen (DE)

(73) Assignee: Alcatel, Paris (FR)

( * ) Notice: Subject to any disclaimer, the term of this patent is extended or adjusted under 35 U.S.C. 154(b) by 395 days.

(21) Appl. No.: 11/055,518

(22) Filed: Feb. 11, 2005

(65) Prior Publication Data

US 2005/0202801 A1 Sep. 15, 2005

(30) Foreign Application Priority Data

Mar. 9, 2004 (EP) .................................. 04290639

(51) Int. Cl.
*H04M 11/04* (2006.01)

(52) U.S. Cl. .................................................. 455/404.1

(58) Field of Classification Search .............. 455/404.1, 455/521, 456.1, 411, 414.1, 414.2, 456.3, 455/456.6, 456.2
See application file for complete search history.

(56) References Cited

U.S. PATENT DOCUMENTS 5,479,482 A 12/1995 Grimes
5,673,304 A 9/1997 Connor et al.
6,073,004 A 6/2000 Balachandran
6,574,484 B1 * 6/2003 Carley ........................ 455/521
7,058,385 B2 * 6/2006 Lauper .................... 455/404.1
7,071,821 B2 * 7/2006 Adamczyk et al. ..... 340/539.18
2002/0137489 A1 9/2002 Dutta et al.
2005/0075116 A1 * 4/2005 Laird et al. ............. 455/404.1
2005/0250440 A1 * 11/2005 Zhou et al. ................. 455/12.1
2005/0282518 A1 * 12/2005 D'Evelyn et al. ........ 455/404.1
2008/0161986 A1 * 7/2008 Breed .......................... 701/23

FOREIGN PATENT DOCUMENTS

DE 202 14 189 U 3/2003
EP 1 304 858 A 4/2003

* cited by examiner

*Primary Examiner*—Melody Mehrpour
(74) *Attorney, Agent, or Firm*—Sughrue Mion, PLLC

(57) ABSTRACT

A method for generating an emergency call as well as an emergency sensing device and a mobile phone for executing this method. An emergency event is triggered on the emergency sensing device. When detecting the emergency event, the emergency sensing device activates a transmitter and transmits an emergency signal via a wireless communication interface to the mobile phone. The mobile phone establishes an emergency call to a predefined destination, when receiving via the wireless communication interface such emergency signal from the emergency sensing device.

7 Claims, 2 Drawing Sheets

EMERGENCY CALL METHOD

BACKGROUND OF THE INVENTION

The invention is based on a priority application EP 04290639.6 which is hereby incorporated by reference.

The invention relates to a method for generating an emergency call as well as an emergency sensing device and a mobile phone for executing the method.

The wide spread use of mobile telephones has decreased the emergency response time of public emergency services, such as fire, police and rescue departments, as more and more passing motorists are able to dial the service number of such services shortly after an emergency situation arises. However, the callers effort to dial such emergency number are hampered because mobile phones may be configured so as to require the entry of an access code to unlog the phone prior to making a telephone call and the subscriber has to remember the service number of the emergency services and has to type in the corresponding service number.

U.S. Pat. No. 5,479,482 describes a mobile phone that transmits information defining its location upon placing an emergency call to an emergency service. The mobile phone uses a GPS receiver (GPS=Global Positioning Service) for determining the location of the mobile phone. In addition, the mobile phone can be programmed to transmit personal characteristics which the subscriber has entered into the mobile terminal. In an emergency situation, the terminal transmits this information at the same time as the location information to the public emergency service. But, also such method of generating an emergency call continuous to require several complex input operations which might be hard to remember or execute for a subscriber in an emergency situation.

SUMMARY OF THE INVENTION

It is the object of the present invention to improve the generation of emergency calls.

The object of the present invention is achieved by a method of generating an emergency call, wherein the method comprising the steps of: triggering an emergency event on an emergency sensing device; activating a transmitter of the emergency sensing device and transmitting an emergency signal via a wireless communication interface from the transmitter to a mobile phone, when detecting an emergency event; and establishing, at the mobile phone, an emergency call to a predefined destination, when receiving via the wireless communication interface an emergency signal from the emergency sensing device. The object of the present invention is further achieved by an emergency sensing device having a housing, a transmitter for transmitting an emergency signal via a wireless communication interface to a mobile phone, a power supply for providing a power to the transmitter, and switching means for activating the transmitter to transmit an emergency signal via the wireless communication interface to a mobile phone, when detecting an emergency event. The object of the present invention is further achieved by a mobile phone having a receiver for receiving emergency signals via a wireless communication interface from at least one emergency sensing device and control means for establishing an emergency call to a predefined destination, when receiving an emergency signal from the at least one emergency sensing device via the wireless communication interface.

The use of the invention makes it possible to introduce an improved emergency call feature that overcomes the aforementioned described drawbacks, wherein the advantages of the new emergency call feature is paired with low implementation costs. The invention decreases the emergency response time. It is not longer necessary that a person confronted with an emergency situation has to search for his mobile phone, has to remember an emergency call number, and has to push several buttons of his mobile phone. It clearly simplifies and fastens the triggering of an emergency call. Further, such advantages are combined with competitive low implementation costs. The emergency sensing device may be constructed as simple, small and cheap mass product. Since a plurality of mobile phones are already equipped with short range wireless interfaces, it is not necessary to carry out any hardware changes or adaptations at the mobile phone side. That is an important advantage since it is not necessary to construct a specific mobile phone adapted to provide an emergency call service. A plurality of already available mobile phones may be used to implement the service as soon as being customized by small software changes.

Further advantages are achieved by the embodiments of the invention indicated by the dependent claims.

According to a preferred embodiment of the invention, the activation of an emergency button provided by the emergency sensing device triggers an emergency event. Preferably, the emergency sensing device is a simple and small device comprising an emergency button as single manual input mean, a transmitter for transmitting the emergency signal via the wireless communication interface to the mobile phone, power supply for providing power to the transmitter and an electronic circuit that activates the transmitter to transmit the emergency signal via the wireless communication interface when the emergency button is pushed by the subscriber. The subscriber may carry such emergency sensing device in its pocket where it might be easily touched and activated by the subscriber in an emergency situation. Further, such simple device may be implemented in the subscribers watch or in jewelry carried by the subscriber. Further, such simple devices may be positioned at different locations the subscribers typically visiting, for example, in each room of his apartment or at a central place of his car. Due to the low price of such emergency sensing device, a subscriber may fix a plurality of such emergency sensing devices at different locations to be in any situation close to an emergency button. One complex device, the mobile phone, serves a plurality of such emergency buttons which drastically reduce the overall implementation costs.

According to one embodiment of the invention, the emergency sensing device transmits a simple predefined message that triggers a specific application of the mobile phone which implements the whole logic of the emergency call service. This makes it possible to use a really simple device as emergency sensing device with a simple, minimum set of components. But, it is also possible that the emergency sensing device comprises a storage unit containing data about the emergency call and a control unit for transmitting this data via the wireless communication interface to the mobile phone. That means that all of the data or at least a part of the data used by the mobile phone for establishing the emergency call are transmitted as part of the emergency signal from the emergency sensing device to the mobile phone. For example, data like the message set has to be transmitted to the destination and the call number of the destination are transferred as part of the emergency signal from the emergency sensing device to the mobile phone. Possibly, standard bluetooth mechanisms can be used to implement this approach. This approach has following advantages: The emergency sensing device becomes independent from a specific mobile phone and may be used in combination with a potential unlimited set of mobile phones. For example, a mobile phone of another subscriber may be used to set up an emergency call. Thereby, the whole system becomes more flexible and the coverage and the overall costs for the provisioning of the service to a specific user group are reduced.

Further, it is possible that the emergency sensing device has a GPS receiver for determining the geographical position of the emergency sensing device. Further, it is possible to use instead of a GPS receiver any other kind of positioning system, e.g. a receiver for the satellite based Gallileo system or a location based service.

The emergency sensing device communicates position data determined by this GPS receiver via the wireless communication interface to the mobile phone to improve the content of the emergency message transmitted to the destination. But, it is also possible that the geographical position of the subscriber may be determined by the mobile phone, by an external GPS receiver that communicates via the wireless communication interface with the mobile phone, or via a network service that determines the position of the mobile phone by help of monitoring the signal levels of radio signals exchanged between the mobile phone and surrounding base stations.

It is possible to direct the emergency call to the phone number of a public emergency service, such as fire, police and rescue departments, or to direct this call to the phone number of a specific subscriber, for example of a relative of the subscriber. Preferably, the destination, for example the mobile phone of a contact person, outputs a specific notification if it detects a call attempt relating to an emergency call. That makes it possible for the addressee to immediately notice the receipt of an emergency call and to handle the emergency call with the corresponding urgency.

According to a further embodiment of the invention, the emergency sensing device has one or several body sensors that automatically trigger an emergency event, when some pre-programmed body measurement thresholds are reached. A supervised person may carry a set of such emergency sensing devices each arranged at a specific place at the body of a supervised person. Each of these emergency sensing devices is capable to interact via the wireless communication interface with the mobile phone and triggers the establishment of an emergency call. This network of body sensors supervises the body of the person, detects emergency events based on body measurements and triggers an emergency call based on these results. Such network detects even emergency events which are not noticed by the supervised person, which increases the overall safety and security of the system.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

DETAILED DESCRIPTION OF THE DRAWINGS

Figure 1:
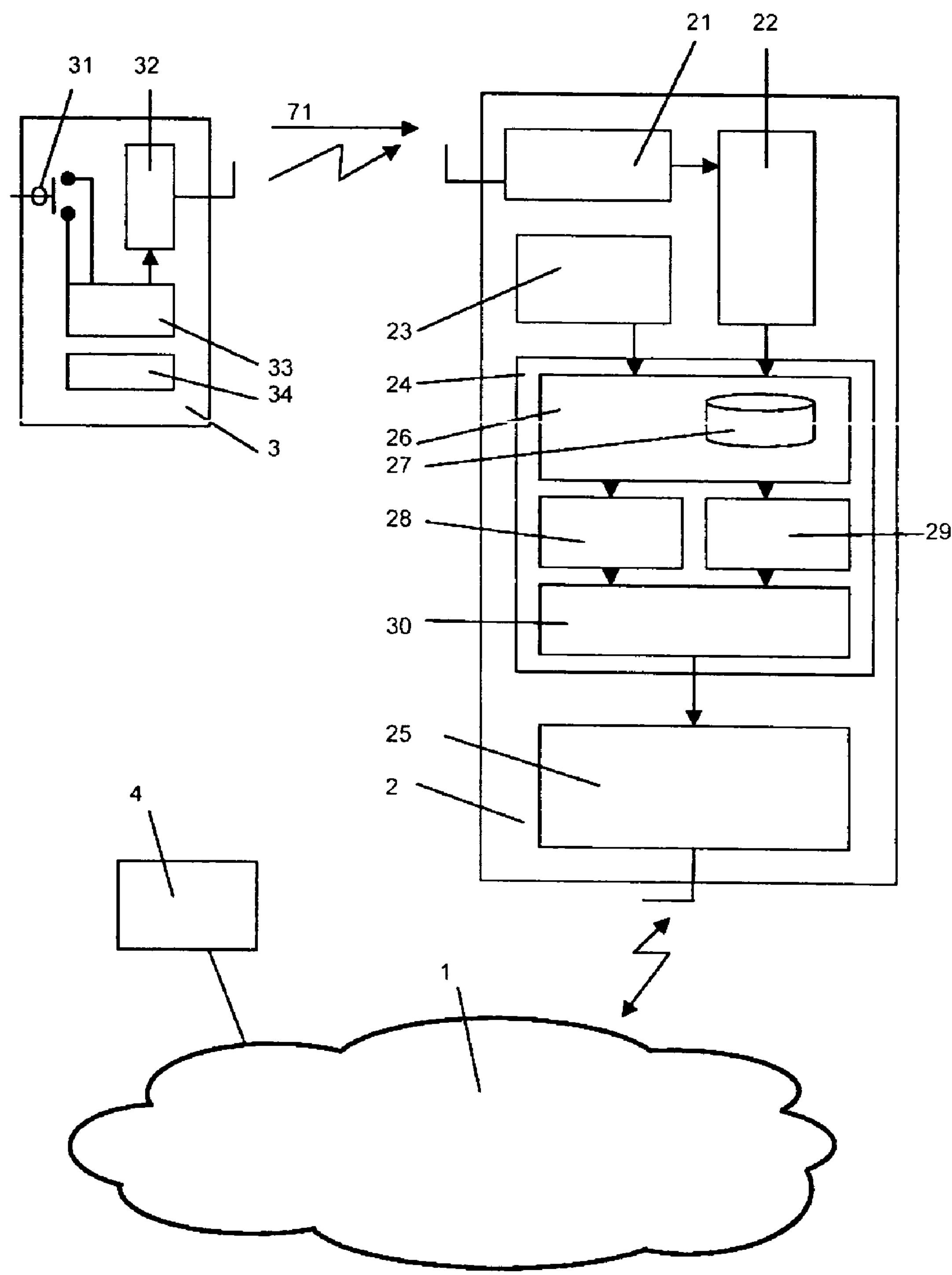
FIG. 1 is a block diagram of an emergency system comprising an emergency sensing device and a mobile phone for a first embodiment of the invention.

FIG. 1 shows a communication network 1, a terminal 4, a mobile phone 2 and an emergency sensing device 3.

The communication network 1 enables a communication between the mobile phone 2 and the terminal 4. Preferably, the communication network 1 is a cellular communication network, for example according to the GSM or UMTS standard (GSM=Global System for Mobile Communication; UMTS=Universal Mobile Telecommunications System). Beside one or several of such cellular communication networks, the communication network 1 may further comprises one or several fixed telephone networks, for example PSTN or ISDN networks (PSTN=Public Switched Telecommunication Network; ISDN=Integrated Services Digital Network). Further, the communication network 1 may further comprise one or several data networks which support a data communication between the mobile phone 2 and the terminal 4. For example, such data networks are IP networks using an IP protocol as level 3 communication protocol (IP=Internet Protocol).

The terminal 4 is a terminal of a subscriber of the communication network 1, for example a further mobile phone, a fixed telephone set, an IP-telephone, or a computer communicating with the mobile phone 2 via a WEB-browser or e-mail system. Further, it is possible that the terminal 4 is a terminal of an emergency agency controlled via a communication server, for example based on IN technology (IN=Intelligent Network).

According to a first embodiment of the invention, the emergency sensing device 3 is a really simple low-cost device having a housing and an emergency button 31, a transmitter 32, an electronic circuit 33 and a power supply 34 arranged in the housing.

The transmitter 32 is a transmitter capable to transmit an emergency signal via a wireless communication interface to the mobile phone 2. Preferably, the transmitter 32 is a bluetooth transmitter capable for handling the bluetooth protocol and the bluetooth radio interface. But, it is also possible that the transmitter 32 serves another kind of short range radio interface. Further, it is possible that the transmitter 32 is an infrared transmitter capable to transmit the emergency signal encoded according to a communication protocol that could be encoded by an infrared receiver of the mobile phone 2. Since more and more mobile phones are equipped with bluetooth and infrared interfaces, the emergency sensing device 3 can be operated with a lot of existing types of mobile phones when supporting such kind of wireless communication interfaces.

The power supply 34 is a battery or rechargeable battery.

The electronic circuit 33 connects the emergency button 31 with the transmitter 32. If the user pushes the button 31, the emergency button 31 triggers at the electronic circuit 33 an emergency event upon which the electronic circuit 33 activates the transmitter 32 to transmit an emergency signal 71 via the wireless communication interface to the mobile phone 2. For example, the electronic circuit 33 sensors the emergency button 31. When the emergency button 31 is activated by a push of the user, the electronic circuit 33 feeds the transmitter 32 and applies a pre-stored data signal to the transmitter 32 that causes the transmitter 32 to transmit a pre-stored message to the mobile phone 2.

Since having such reduced minimum set of components, the emergency sensing device 3 may have a really small size, for example having the form of a check card which may be carried in the pocket of a user or which may be fixed via an adhesive tape at various places, for example at the steering wheel of a vehicle.

The mobile phone 2 is composed of a housing, a microprocessor with a plurality of peripheral units, a radio communication unit for communicating with the communication network 1, various input and output units, for example a keypad, a liquid crystal display, a camera, a loudspeaker and a microphone and with a transceiver for handling a short range wireless communication interface, for example a bluetooth transceiver or an infrared transceiver. Further, the mobile phone 2 comprises various software programs execute by the microprocessor and controlling the functionalities provided by the aforementioned hardware components. Thereby, the mobile phone 2 provides its functionalities by the interaction of its aforementioned hardware and software components and comprises from functional point of view a receiver 21, a communication unit 22, control units 23 and 24 and a communication unit 25.

The receiver 21 is a bluetooth or infrared receiver. the communication unit 22 decodes the signals received via the receiver 21. For example, it decodes the emergency signal 71 received by the receiver 21 and forwards this signal to the control unit 24.

The control unit 24 is provided by the execution of a software program on the hardware platform provided by the mobile phone 2. The control unit 24 initiates the establishment of an emergency call to a predefined destination, when the mobile phone 2 receives via the wireless interface provided by the receiver 21 and the communication unit 22 an emergency signal from at least one emergency sensing device, for example from the emergency sensing device 3.

This software program reprograms a standard mobile phone to act as a mobile phone according to the invention. The software program can be already installed at the end of manufacturing of mobile phone or at the point of sales, so it has only to be later on activated by the user of the mobile phone to provide the aforementioned functionalities. But, it is also possible that this computer program is later on downloaded from a network server via the communication network 1 or downloaded from a computer via the wireless communication interface provided by the receiver 21 and the communication unit 22 or via a connector connecting a serial or parallel interface of the mobile phone 2 with the computer. For example, the software program is stored on a data carrier and this data carrier is distributed as packet together with the emergency sensing device 3 to the end user.

The control unit 24 can execute several operations 26, 28, 29 and 30.

The operation 26 receives signals from the communication unit 22 and the control unit 23. The control unit 23 determines the geographical position of the mobile phone 2. For example, it comprises a GPS receiver or contacts a localization server that determines the geographical position of the mobile phone 2 by means of radio signal levels of base stations communicating with the mobile phone 2. The control unit 23 submits the determined geographical position to the operation 26. But, it is also possible to implement the invention without such determination of the geographical position of the mobile phone 2.

The operation 26 determines whether a signal received from the communication unit 22 is an emergency signal received from an emergency sensing device. For performing this computation, the operation 26 compares the received signal with a set of predefined signals, e.g. containing the pre-programmed message of the electronic circuit 33. Further, it is possible that it compares the sender identification contained in the received signal with a set of predefined identifiers assigned to (registered) emergency sensing devices.

Further, the operation 26 contains a data set 27 specifying one or several destinations of an emergency call and a message that has to be submitted to this destination in an emergency situation. Further, the data set 27 may comprise a user profile that specifies under which circumstances, for example dependent on time or geographical position, which destination via which communication channel, for example via SMS service or via voice communication service (SMS=Short Message Service), has to be contacted and which message has to be submitted to the destination. It is possible that the data set 27 is personalized by the user before downloading the software program to the mobile phone 2. Further, it is possible that the user inputs and amends data of the data set 27 by help of the user interface provided by the mobile phone 2.

The operations 28 and 29 enable the establishment of an emergency call via different communication services. For example, the operation 28 executes functionalities to transmit a SMS with a SMS-text defined by the operation 26 to a SMS-destination specified by the operation 26. The operation 29 executes functionalities for dialing a number specified by the operation 26 and transmits a voice message specified by the operation 26 when the telecommunication connection to this number is established.

The operation 30 checks, whether the user of the mobile phone 2 has enabled the provisioning of the emergency service or not. If the service is not enabled, it blocks the execution of the functions provided by the operations 28 or 29. If not, it enables the communication between the functions executed by the operations 28 and 29 and the control unit 25 which represent the basic functionalities of the mobile phone 2.

To set up the service for generating an emergency call described above, the user has first to personalize the data set 27, has to install the software program on the mobile phone 2 and activate this feature within the functional set provided by the mobile phone 2. Further, it has to introduce the emergency sensing device 3 to the mobile phone 2, so that the sender identification of the emergency sensing device 3 is known to the communication unit 22 and communications from the emergency sensing device 3 are accepted by the communication unit 22 (in case the transmitter 32 and the receiver 21 based on bluetooth technology). But, it is also possible to use an Infrared or WLAN base transmitter and receiver pair.

If the user pushes in the following the emergency button 31, the emergency button 31 triggers an emergency event on the emergency sensing device 3 and the electronic circuit 33 activates the transmitter 32 when detecting this emergency event. Then, the transmitter 32 transmits the predefined emergency signal 71 to the mobile phone 2. The control unit 24 initiates the establishment of an emergency call to a predefined destination, for example the terminal 4 when it detects the receipt of the emergency message 71 form the emergency sensing device 3.

According to a further embodiment of the invention, all or a part of the data of the data set 27 are stored in the emergency sensing device 3 and submitted via the emergency signal 71 to the control unit 24. The electronic circuit 33 of the emergency sensing device 3 contains storage means to store this data. The personalization of these data are executed via the short range communication interface provided by the transmitter 32, which in this case has additional functionalities for executing a bi-directional communication connection. But, it is also possible that the emergency sensing device 3 has an additional interface to download such personalized data in the memory means or to amend these data. According to this embodiment of the invention, the mobile phone 2 is in a position to establish emergency calls to different destinations and transmit different personalized emergency messages to these destinations, dependent on the emergency signal and the emergency sensing device the emergency signal is received from. That makes it possible to establish user groups wherein a set of personalized emergency sensing devices share a common set of mobile phones. Further, it is possible that the emergency call depends on the kind of emergency sensing device (see embodiment according to FIG. 2).

According to a further embodiment of the invention, the functionalities of the control unit 23 are implemented within the emergency sensing device 3. In that case, the emergency sensing device 3 determines its geographical position, when detecting an emergency event. Then, it submits its geographical position as part of the emergency signal 71 to the mobile phone 2 which in the following communicates this geographical position to the predefined destination.

Figure 2:
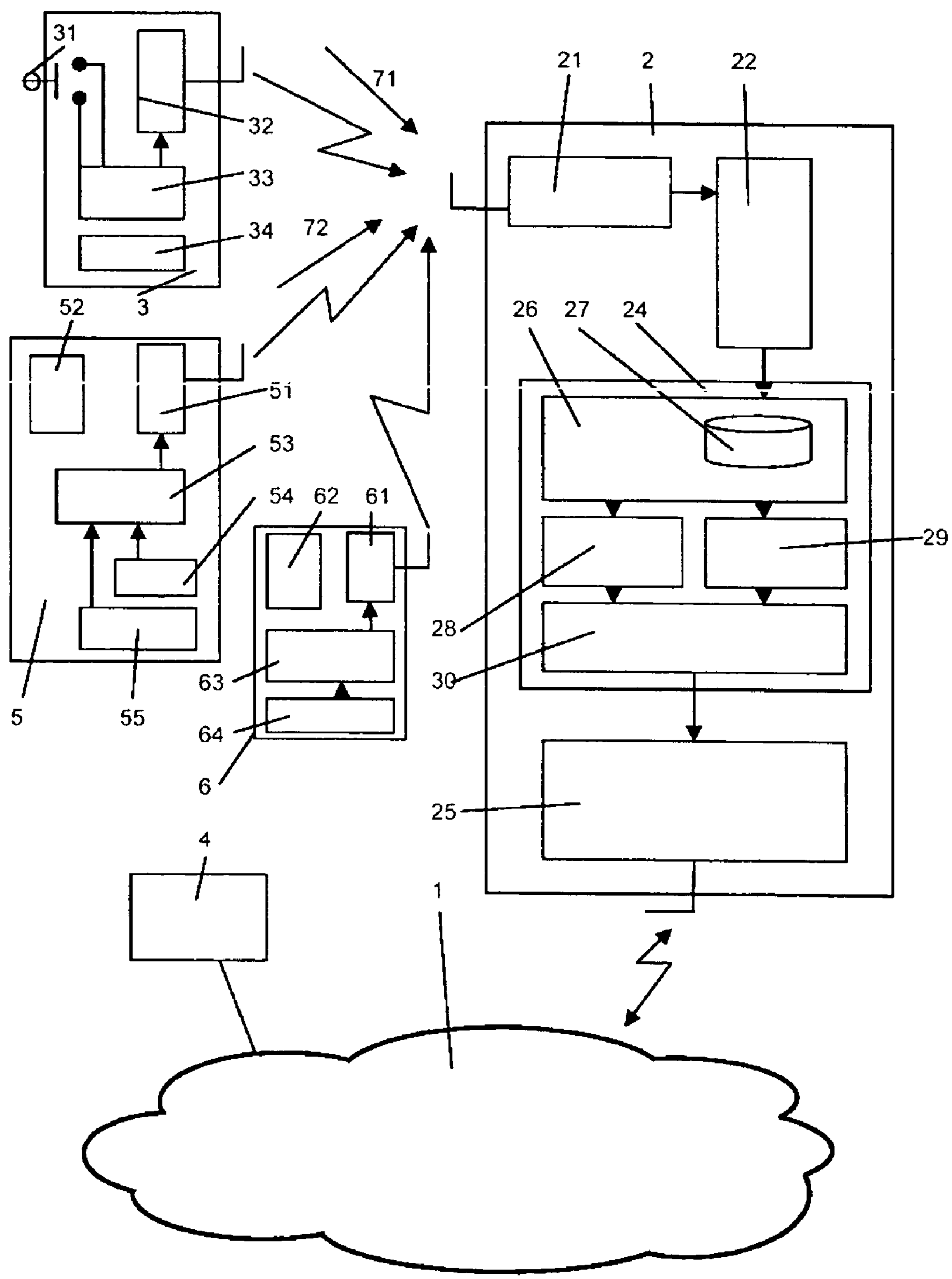
FIG. 2 shows a block diagram of an emergency system comprising a mobile phone and several emergency sensing devices according to a second embodiment of the invention.

Further embodiments of the invention are exemplified by hand of FIG. 2.

FIG. 2 shows an emergency system with the terminal 4, the communication network 1, the mobile phone 2, the emergency sensing device 3, a further emergency sensing device 5 and an external unit 6.

The communication network 1, the terminal 4, the communication units 22 and 25, the receiver 21, the control unit 24, and the components 31, 32, 33 and 34 of the emergency sensing device 3 as well as the components 21, 22, 24, 26, 27, 28, 29, 30 and 25 of the mobile phone 2 are arranged according to the embodiments described by help of FIG. 1.

The mobile phone 2 of FIG. 2 does not contain the control unit 23.

The external unit 6 takes over the functionalities of the control unit 23. The external unit 6 has a power supply 62, a transmitter 61, a control unit 63 and a GPS receiver 64 (GPS=Global Positioning System). The GPS receiver 64 determines its geographical position and submits this information to the control unit 63. On request, the control unit 63 triggers the transmitter 61, which is preferably a bluetooth or Infrared transmitter, to transmit the geographical position to the mobile phone 2.

The emergency sensing device 5 has at least one body sensor automatically triggering an emergency event, when some pre-programmed body measurement thresholds ore reached. In contrast to the emergency sensing device 3 where the triggering of an emergency event is initiated by the user, the emergency sensing device 5 automatically triggers the establishment of an emergency call.

The emergency sensing device 5 comprises a power supply 52, a transmitter 51, an electronic circuit 53 and two body sensors 54 and 55. For example, the body sensors 54 and 55 supervise the heartbeat and blood pressure of the user. The electronic circuit 53 compares the body measurements of the body sensor 54 and 55 with pre-programmed thresholds. If one of the thresholds are reached or exceeded, an emergency event is triggered. When detecting the triggering of an emergency event, the electronic circuit 53 feeds the transmitter 51 and applies an electronic signal to the transmitter 51 initiating the transmission of a pre-programmed emergency signal 72 to the mobile phone 2, which is computed by the mobile phone 2 as described above by hand of the first embodiment of FIG. 1.

But, it is also possible that the electronic circuit 53 executes some more complex functionalities, for example transmitting measurement values via the emergency signal 72 to the mobile phone 2 or transmitting all or a part of the data of the data set 27 as part of the emergency signal 72 to the mobile phone 2.

The emergency sensing devices 3 and 5 and the external unit 6 form the body network carried by the user to guarantee that each emergency situation is detected and encountered by the establishment of an emergency call to a predefined destination. Such body network may contain several emergency sensing devices equipped as the emergency sensing device 5 and placed at different places at the body of the user dependent on the body measurements exceeded by the respective emergency sensing device.

The invention claimed is:

1. A method of generating an emergency call, the method comprising:

triggering an emergency event on an emergency sensing device;

activating a transmitter of the emergency sensing device and transmitting an emergency signal via a wireless communication interface from the transmitter to a mobile phone, when detecting the emergency event; and establishing, at the mobile phone, an emergency call to a predefined destination, when receiving via the wireless communication interface, the emergency signal from the emergency sensing device, wherein activation of an emergency button provided on the emergency sensing device triggers the emergency event, and wherein a message to be transmitted to the predefined destination and a call number of the predefined destination are provided in the emergency signal transmitted from the emergency sensing device to the mobile phone.

2. The method of claim 1, further comprising determining a geographical position of the emergency sensing device or of the mobile phone and communicating the geographical position through the mobile phone to the predefined destination.

3. The method of claim 1, further comprising outputting a specific notification at the predefined destination, if the predefined destination detects a call attempt relating to the emergency call.

4. The method of claim 1, wherein a body sensor automatically triggers the emergency event, when some pre-programmed body measurement thresholds are reached.

5. An emergency sensing device comprising:

a housing, a transmitter for transmitting an emergency signal via a wireless communication interface to a mobile phone, a power supply for providing power to the transmitter, switching means for activating the transmitter to transmit an emergency signal via the wireless communication interface to a mobile phone, when detecting an emergency event, and an emergency button arranged to activate the transmitter to transmit the emergency signal via the wireless communication interface to the mobile phone, when being activated, and a storage unit containing data about the emergency call and a control unit for transmitting this data to the mobile phone, wherein a message to be transmitted to a predefined destination and a call number of the predefined destination are provided in the data.

6. The emergency sensing device of claim 5, further comprising a GPS receiver for determining the geographical position of the emergency sensing device and for communicating the geographical position to the mobile phone via the wireless communization interface.

7. A mobile phone comprising:

a receiver for receiving emergency signals via a wireless communication interface from at least one emergency sensing device; and control means for establishing an emergency call to a predefined destination, when receiving an emergency signal from the at least one emergency sensing device via the wireless communication interface, wherein the receiver is operative to receive a message to be transmitted to the predefined destination and a call number of the predefined destination, the message and the call number being provided in the emergency signals.

* * * * *